Oct. 8, 1957      L. L. MYERS ET AL      2,808,832
FILM-TIPPED CATAMENIAL TAMPONS
Original Filed April 24, 1952      2 Sheets-Sheet 1
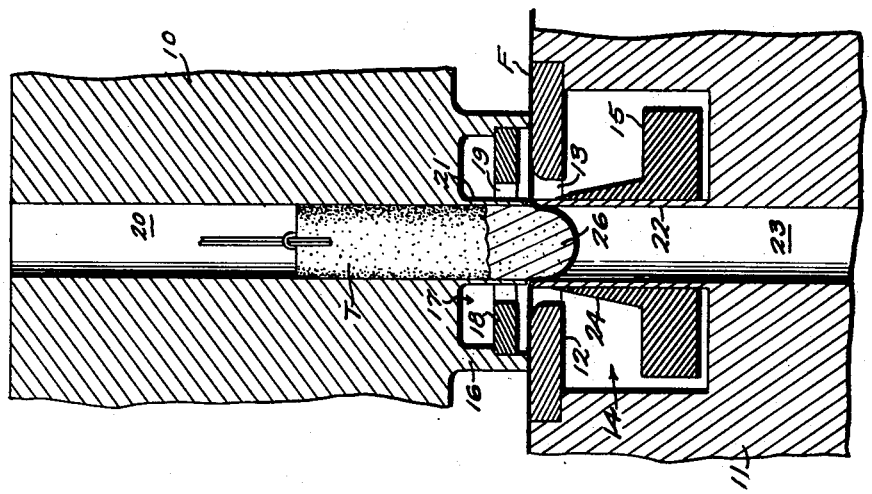
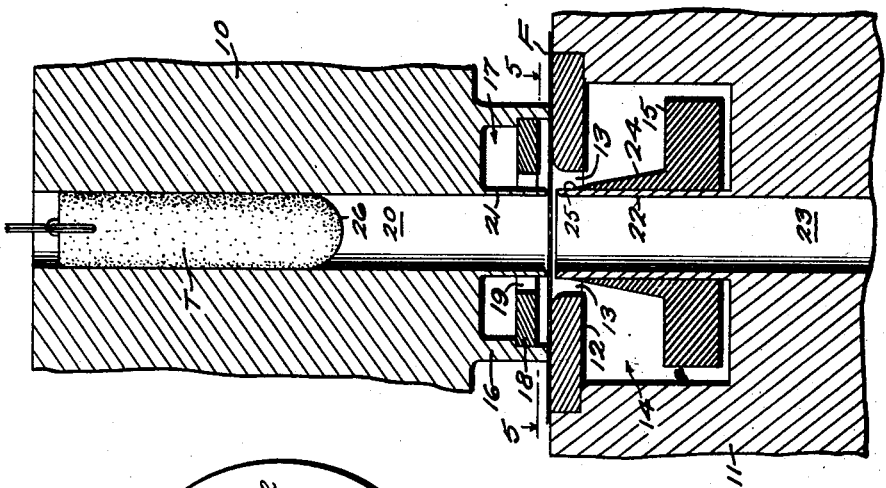
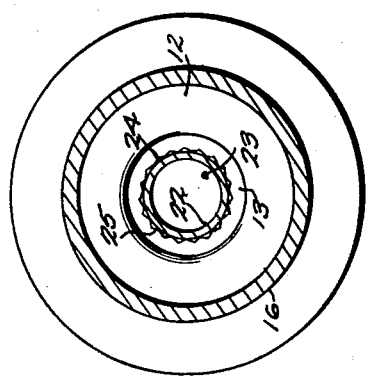
INVENTOR
FRANK P. PARISH
J. LLOYD STRAUGHN
LEW L. MYERS
BY
ATTORNEY

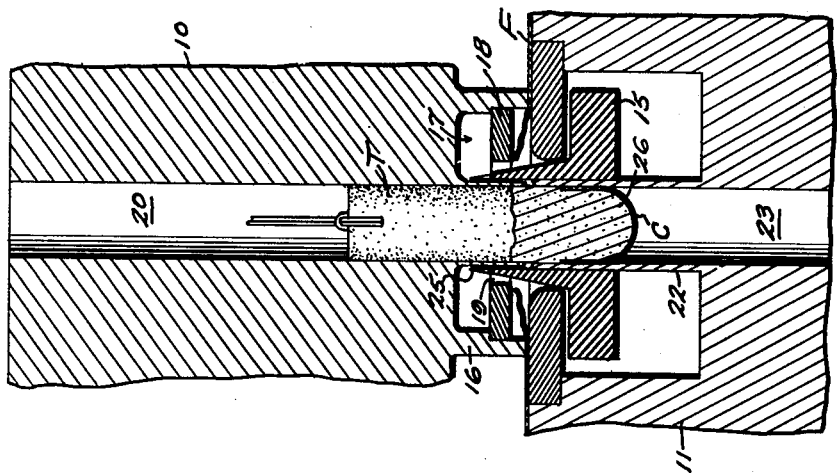
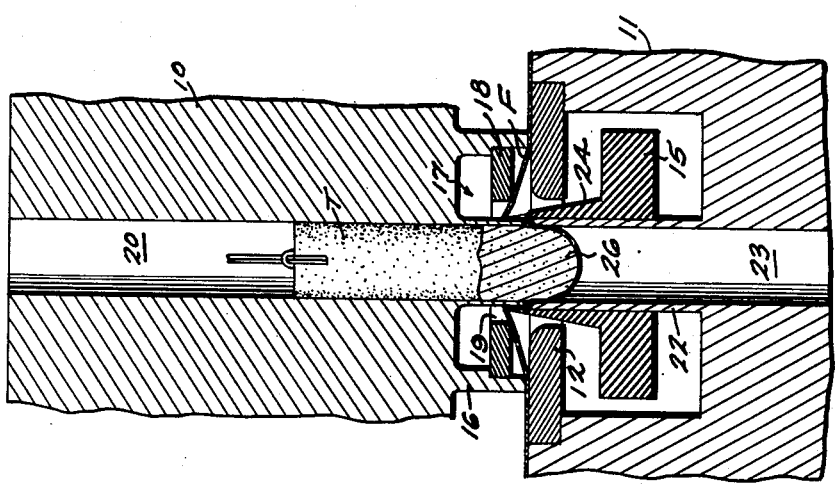
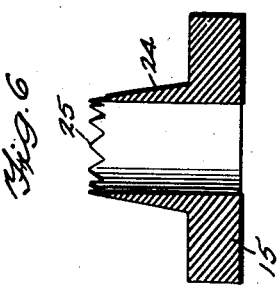
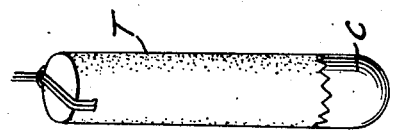
INVENTOR
FRANK P. PARISH
J. LLOYD STRAUGHN
LEW L. MYERS
BY
ATTORNEY

2,808,832

FILM-TIPPED CATAMENIAL TAMPONS

Lew L. Myers, Walkersville, and Frank P. Parish, Taneytown, Md., and John Lloyd Straughn, West Chester, Pa., assignors to Sanitary Products Corporation, Chicago, Ill., a corporation of Illinois Original application April 24, 1952, Serial No. 284,136. Divided and this application July 19, 1954, Serial No. 444,038

2 Claims. (Cl. 128—285)

The present invention relates to improved tampons and particularly to improved film-tipped catamenial tampons.

Tampons have been in use for many years for absorbing discharges and secretions from body cavities. Although preferable in many respects to surface applications for this purpose, the use of tampons has been limited by certain disadvantageous features. The prior art tampons were difficult to insert, especially when they had to be large enough to absorb a heavy flow of body fluid. This objectionable characteristic was particularly noticeable with catamenial tampons, where delicate membranes can be chafed and abraded by their use. The art was confronted with a problem of insertion and of irritation during and after insertion.

The prior art attempted to avoid these handicaps in the use of catamenial tampons by providing a tube or other applicator through which the tampons could be inserted. Another method employed for facilitating the insertion was to lubricate the tampon, which eliminated irritation and facilitated insertion. However, the art was striving to improve tampons to provide quick opening of absorbent material to insure quick absorption of fluids, particularly during a stage of heavy flow, and to prevent leakage.

The defects of a separate all-over coating or the like were partly overcome by the development of a coated tampon.

However, the prior art coated tampons were not adapted for the absorption of as large an amount of menstrual fluid as the mass of absorbent material which they held seemed to indicate, and their speed of absorption was relatively slow.

U. S. Patents Nos. 2,340,311 and 2,440,141 to Arthur B. Donovan which are owned by the assignee of this application constituted a meritorious and substantial advance in the art. In those patents the tampon has a relatively large mass of absorbent material that is compressed into a relatively small volume of cylindrical form. While still under compression the cylinder is heated to produce an ironing effect, after which the entrant end is rounded off and dipped into a solution of a coating composition. The coating is then dried to provide a binding or retentive film which retains the underlying compressed absorbent material in the compressed state. The composition of the coating is such that it dissolves readily in the body fluids and allows the compressed material to expand to facilitate the absorption of a relatively large volume of the fluids. A surface-active agent dispersed in the film acts on the body fluid to lower its surface tension so that it penetrates rapidly into the film or coating and thus increases the rate of dispersion of the film into the body fluids. At the same time, the lowering of viscosity and surface tension facilitates absorption of the fluids by the material of the tampon.

It has been found, however, that the liquid nature of the coating, during the drying interval in the manufacturing operation, permits to some degree its absorption by the compressed material of the tampon, with a resultant objectionable loosening and swelling of the material. This impairs the smoothness and cylindrical contour of the article, detracting from its appearance as well as impairing its efficiency. In addition, the speed of absorption is too slow by reason of the fact that the tip does not open as quickly as desired. It is apparent, therefore, that a coating applied as a liquid and dried in situ does not give wholly satisfactory results.

We have discovered that all the advantages of the said Donovan patents can be secured, and improvements can be obtained by applying the desired coating composition in the form of a prefabricated stretchable plastic film dispensed to the locus of application as a web fed from a supply roll or other source, and there converted into a skirted tip tightly adhering to and stretched over the entrant end of the tampon while at the same time retaining the shape of the end.

An object of the invention is to provide, as a new article of manufacture, an improved catamenial tampon having its entrant end portion tipped with a prefabricated plastic lubricant film that is readily dispersible by or soluble in body fluids.

Another object of the invention is to provide, as a new article of manufacture, an improved catamenial tampon having its entrant end portion tipped with a prefabricated stretchable plastic film which sticks to the cotton but dissolves freely in the body fluids.

It is also within the contemplation of the invention to provide, as a new article of manufacture, an improved catamenial tampon having its entrant end portion tipped with a prefabricated stretchable plastic film in which the tampon itself constitutes a core upon which the film is shaped and affixed by the application of heat and pressure.

A further object of the invention is to provide, as a new article of manufacture, an improved catamenial tampon having its entrant end portion tipped with a prefabricated plastic lubricant and rendered automatically self-conforming to the surface configuration of the tampon.

The invention also contemplates the provision of an improved catamenial tampon having a tip made of a prefabricated planar film of thermoplastic material which is formed by heat and pressure.

A still further object of the invention is to provide, as a new article of manufacture, an improved catamenial tampon having a dry-coated entrant end with a prefabricated film of desired composition.

Other objects will be apparent from the following description taken in conjunction with the accompanying drawings, in which:

Figure 1 is a fragmentary sectional view through an apparatus by which the method is carried out, illustrating an initial step in the application of a prefabricated film tip to a tampon;

Figures 2–4 are views similar to Figure 1 and illustrate, respectively, different successive steps of the method for producing the new film-tipped catamenial tampon;

Figure 5 is a sectional view on the line 5—5 of Figure 1;

Figure 6 is an axial sectional view through the knife employed to sever the film; and Figure 7 is a perspective view of a tampon tipped in accordance with the invention.

In the practice of the present invention, a web or sheet of prefabricated stretchable film of the desired composition of plastic material and of appropriate width and thickness is disposed and anchored flatly in a plane normal to the axis of a cylindrical tampon that is to be tipped. The tampon, finished except for the tip, is forced axially against the held film with the compressed and rounded entrant end of the tampon engaging and stretching the film over and around it as a tightly fitting skirted tip. At a predetermined point during the stretching of the film, the stretched portion is cut substantially in a circle around the tampon and is carried on and with the tampon into a closely fitting heated tube by which it is pressed against and bonded to the body of the tampon while still in a somewhat stretched state; so that it grips the end portion in a tight engagement that cannot be broken without tearing the tampon apart.

For the purposes of illustration only, and without restriction thereto, a preferred embodiment of apparatus suitable for carrying out the method of the present invention is shown generally in the drawings. It includes a pair of coacting members 10 and 11 adapted to grip firmly between them a strip of prefabricated plastic film F of the desired composition, with the film lying flatly against a planar bed plate 12 fixed in one of the members, here indicated as 11. The bed plate is centrally apertured as at 13 and constitutes the outer wall of a chamber 14 recessed in the body of the member and housing means 15 operative to sever the film as later described. The member 10 is provided with an annulus 16 adapted to bear flatly against the film strip and clamp it tightly against the bed plate 12 upon appropriate movement of either member 10 or 11 toward the other. The annulus constitutes a pressure ring and its interior provides a chamber 17 opposing the chamber 14 in the member 11. A guide disc 18 is fixedly mounted within the annulus, preferably by press-fitting in a complemental seat in its wall, so that it is disposed axially inward of the film engaging edge. The guide disc is parallel to the bed plate 12 and has a central aperture 19 in axial registry with the bed plate aperture.

In this apparatus the member 10 is a tampon carrier and has a cylindrical bore 20 extending therethrough concentric with the annulus 16. The body of the member 10 has a tubular extension 21 into the chamber 17 through the guide disc aperture as a continuation of the bore 20, and which terminates very slightly inwardly of the plane of the film engaging edge of the annulus. An identical and opposite tubular extension 22 of the member 11 within the chamber 14 constitutes a continuation of a bore 23 through the body of the member in axial alignment with the bore 20 of the member 10. The severing means 15 is reciprocable axially on the tube 22 and may also have rotary movement thereon if desired. A part of the means 15 is constituted as a sleeve 24 normally extending into the bed plate aperture 13 and there formed with a saw tooth edge 25 providing a circular cutter which, in inactive position, is disposed appreciably inwardly from the plane of the film engaging face of the bed plate. The end of the tube 22 is disposed only very slightly inwardly of this plane, so that the opposed ends of the two tubes are spaced apart a distance only slightly greater than the thickness of the film when it is clamped between the annulus 16 and the bed plate 12. When in service, the tube 22 and member 11 are maintained at a temperature of approximately 100° F.

Any appropriate film-forming material having the properties of water solubility, flexibility, stretchability, blandness and stability can be used for the film. The materials that can be used in this film are methyl cellulose, hydroxyethyl cellulose, sodium cellulose sulfate, carboxymethyl cellulose, polyvinyl alcohol or any of the water soluble plastics that can be cast into a flexible film. Also such substances as mentioned in the Donovan patents as film formers can be incorporated in varying proportions with the above materials to form the film. It is also desirable to incorporate certain plasticizers such as glycerine, sorbitol, other polyhydric alcohols, or polyoxyethylene glycols and higher alcohol derivatives such as polyoxyethylene lauryl alcohol, also polyethylene glycols, to impart more flexibility to the film. The amount of plasticizer may vary from a few percent to 200%, preferably about 10–30% in most cases.

There can also be incorporated in the film certain surface active agents which are compatible with the film-forming material used, such as sodium lauryl sulfate, to lower the surface tension of the menstrual fluid as given in the Donovan patents.

It is desirable that the film have sufficient flexibility so that when applied it can be stretched over the end of the tampon and around the sides to give an end free of wrinkles and creases, leaving a smoothly covered tip. This flexibility can be obtained by the use of plasticizers mentioned above, by moistening the film with water or conditioning it in an atmosphere with proper relative humidity, by heating the film when it is applied, or by applying the film in a heated block or tube, or any combination of these.

When properly treated and applied, the film should be flexible enough to be stretched to double its original length without breaking. It is further necessary to have a flexible film because it must stretch quickly so that the tampon will not puncture or stamp out a piece of the film at the tip. The film also helps to compress the end of the tampon and gives it the desired stiffness for insertion while at the same time helping to maintain the shape of the tampon.

The thickness of the film can be from about 0.001" to about 0.010", preferably between about 0.002" and about 0.006". If too thin, the film will either break before stretching over the tip end of the tampon or be stretched to such an extent that it is too thin on the walls of the cylindrical tampon and cannot be easily inserted due to rapid dissolving of the thin film.

The film is caused to adhere to the cotton fibers through the application of heat and/or an adhesive applied to the film. This adhesive can be any water soluble material which can be applied to the film in solution or by water spraying or moistening just before application and dried on the film without dissolving the film or causing it to be weakened or distorted.

It should not be so sticky when dry that it adheres strongly to itself or to other surfaces but on heating should give good adhesion to the cotton fibers. Gum acacia dissolved in water with a suitable plasticizer such as sorbitol or one of the polyhydric alcohols has been found satisfactory. Other adhesives can be made containing the natural gums such as gum tragacanth and gum karaya, also starch with polyvinyl alcohol and water soluble dextrine plasticized with suitable plasticizers as mentioned above have been found satisfactory.

At the beginning of a tipping operation, as indicated in Fig. 1, a tampon T with pull string attached is delivered to the member 10, where it is retained in the bore 20 by frictional engagement, with its rounded entrant end 26 spaced from the exit end of the tube 21. A planar strip of the prefabricated plastic film F is placed flatly on the bed plate 12 with its adhesive facing directed toward the tampon where it occupies a plane normal to the axis of the tampon and extends fully across and over the face of the plate and its aperture 13. At this stage, the tampon is finished except for tipping. The members 10 and 11 are then brought together, preferably by movement of the member 10 against the member 11, so that the film is clamped tightly between the annulus 16 and the bed plate and thus is anchored against bodily movement in any direction in the plane which it then occupies.

Following the anchoring of the film on the bed plate pressure is applied on the pull string end of the tampon, preferably by a ram, not shown, and the tampon is moved axially through the tube 21 against the film and into the tube 22 of the member 11. During this travel of the tampon its rounded entrant end 26 engages the film and stretches it tightly around and over the end and the adjacent portion of the tampon body, as shown in Fig. 2. The film begins to stretch as soon as the end of the tampon passes from the tube 21, and the stretch increases progressively as the tampon moves into the tube 22. This tube and the member 11 are heated, being maintained at a temperature of approximately 100° F., so that as the tampon advances within the tube the film is softened by heat and is molded directly upon the tampon as a core by the heat and by pressure of the tube wall supplementing the pull of the anchored film in stretching over the rounded end of the tampon.

During advance of the tampon into the tube 22 the severing means 15 is actuated, by suitable means not shown, to move the saw tooth edge knife 25 against the film as shown in Fig. 3. The film, now heat softened and pliable, is carried by the knife into the annulus chamber 17 until stopped by the guide disc 18; whereupon the knife continues through the disc aperture 19 and there pierces the film and cuts it, in a form approximating a circle on the axis of the tampon, into a blank which constitutes a skirted tip C that is carried entirely into the heated tube 22 by farther advance of the tampon therein, as shown in Fig. 4. The cutting action of the saw tooth knife results in a serrated edge on the tip blank, and as the blank passes into and through the tube 22 the apices of the serrations are pressed firmly into the fibers of the tampon body by the ironing action of the heated tube. In this operation the motion is continuous; while the tampon is moving from the tube 21 into the tube 22 the severing means 15 moves oppositely and in timed relation to the movement of the tampon. Adjustment of this timed relation controls the length of the skirt. After application of the tip, the tampon is passed entirely through the bore 23 wherein the heated wall of the bore irons and sets the surface fibers in a smooth skin, and is transferred from the member 11 for subsequent wrapping and packaging; the severing means is retracted to initial position; and the members 10 and 11 are separated for reception of another length of film therebetween.

It is to be understood that the present disclosure is illustrative and not restrictive, and that the invention may be practiced in any manner and by any embodiment consistent with its scope as claimed.

From the above detailed description it is apparent that in its broad aspects the invention contemplates a relative movement between a tampon and a prefabricated solid body of coating material such that the body is caused to encompass at least the entrant end portion of the tampon, after which the applied body is shaped and bonded to the tampon by heat and pressure. The operation is a dry coating method as contrasted with wet coating methods in which the coating material is applied in the liquid state and dried on the tampon. It is within the purview of the invention, and contemplated, that the entrant end of the tampon may be inserted in a preformed tip of the desired coating composition and then passed through the sleeve 22 or its equivalent, preferably heated, to facilitate shaping and bending of the tip to the body of the tampon.

The present application is a division of our pending application, Serial No. 284,136, filed April 24, 1952.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. As a new article of manufacture, a catamenial tampon comprising a cylindrical body of compressed fibrous absorbent material having a rounded entrant end, and a tip tightly encasing said end and compressing its fibers, said tip being a prefabricated taut film of material readily soluble and dispersible in body fluids and molded on said end.

2. As a new article of manufacture, a catamenial tampon comprising a cylindrical body of fibrous absorbent material having a substantially rounded entrant end, and a plastic film tip encasing said end and the adjacent portion of the tampon body, said tip having a single annular serrated edge whereof the apex portions are compressed into the subjacent fibers of the tampon body, and said tip being a prefabricated film of water soluble material readily dispersible in body fluids and bonded to the surface of the tampon.

References Cited in the file of this patent

UNITED STATES PATENTS

| | | |
|---|---|---|
| 2,267,030 | Hill | Dec. 23, 1941 |
| 2,340,311 | Donovan | Feb. 1, 1944 |